United States Patent [19]

Lindner et al.

[11] 4,393,172

[45] Jul. 12, 1983

[54] HIGH-NOTCHED-IMPACT CORE-SHELL POLYMERS HAVING IMPROVED WEATHER RESISTANCE

[75] Inventors: Christian Lindner, Cologne; Karl-Heinz Ott, Leverkusen; Alfred Pischtschan, Kuerten, all of Fed. Rep. of Germany

[73] Assignee: Bayer Aktiengesellschaft, Leverkusen, Fed. Rep. of Germany

[21] Appl. No.: 309,569

[22] Filed: Oct. 8, 1981

Related U.S. Application Data

[63] Continuation-in-part of Ser. No. 235,096, Feb. 17, 1981, abandoned.

[30] Foreign Application Priority Data

Feb. 23, 1980 [DE] Fed. Rep. of Germany ....... 3006804

[51] Int. Cl.³ ..................... C08L 51/04; C08F 279/02; C08F 265/04
[52] U.S. Cl. ..................................... 525/310; 525/71; 525/80; 525/82; 525/83; 525/305; 525/902
[58] Field of Search ..................... 525/83, 80, 82, 310, 525/902, 71

[56] References Cited

U.S. PATENT DOCUMENTS

| 3,636,138 | 1/1972 | Beer ........................................ 525/83 |
| 3,886,232 | 5/1975 | Tanaka et al. .................... 260/876 R |
| 3,900,529 | 8/1975 | Beer .................................... 260/876 |
| 3,956,424 | 5/1976 | Murayama et al. .................... 525/83 |

FOREIGN PATENT DOCUMENTS 1371866 8/1964 France .
2246594 5/1975 France .

OTHER PUBLICATIONS

Chemical Abstracts, vol. 78, p. 51, No. 137322m (1973).
Chemical Abstracts, vol. 90, p. 32, No. 55728g (1979).

Primary Examiner—Carman J. Seccuro
Attorney, Agent, or Firm—Connolly and Hutz

[57] ABSTRACT

A particulate graft polymer comprising (a) a core formed by a crosslinked homopolymer of a conjugated diene or a copolymer thereof with up to 10% by weight of styrene or acrylonitrile; (b) a first shell formed by a crosslinked homopolymer of an acrylic acid alkyl ester or a copolymer thereof with up to 30% by weight of vinyl monomers; (c) a second shell formed by a polymer of resin-forming monomers, a process for manufacturing these graft polymers by means of a multi-stage emulsion polymerization, and their application as molding compositions, optionally together with rigid thermoplastic resins.

6 Claims, No Drawings

HIGH-NOTCHED-IMPACT CORE-SHELL POLYMERS HAVING IMPROVED WEATHER RESISTANCE

This application is a CIP of application Ser. No. 235,096, filed Feb. 17, 1981, now abandoned.

This invention relates to graft polymers and to their use as elastic thermoplastic molding compositions.

In principle, the graft polymers according to the invention consist of particles with a diene rubber as core surrounded by at least two chemically different shells. So-called ABS (acrylonitrile-butadiene-styrene) plastics are of considerable technical significance. On account of the diene (for example butadiene) which they contain in polymeric form, the weather resistance of these plastics is unsatisfactory so that they can only be used to a limited extent in the open. Even UV absorbers or light stabilisers are incapable of completely eliminating this drawback. If the oxidation-sensitive diene rubber is replaced, for example by an alkyl acrylate rubber, the impact strength and appearance of the mouldings are unsatisfactory. To obtain good physical properties, the acrylate rubbers used instead of the diene rubber have to be crosslinked. To produce them, suitable monomers are polymerised in emulsion in the presence of polyfunctional monomers or alternatively an initially uncrosslinked polymer is treated with an organic peroxide, for example benzoyl peroxide. However, the acrylate rubber is softer and less elastic than the diene rubber. Injection mouldings of acrylate-based graft polymers frequently have a mother-of-pearl-like sheen over their entire surface. This effect can become intensified on dyeing, so that the product is unsuitable for general use. Moreover, the impact strength of these moulding compositions is inconsistent and, although this drawback may be overcome by increasing the degree of crosslinking of the rubber, the impact strength is greatly reduced.

The present invention provides particulate graft polymers comprising a core (a) formed by a highly crosslinked diene rubber, a first shell (b) formed by a crosslinked acrylate rubber and a second shell (c) formed by a polymer or copolymer of resin-forming monomers.

The quantitative ratio between the core (a) and the first shell (b) is from 0.1:99.1 to 80:20 and preferably from 10:90 to 50:50 and the proportion of (c) in the graft polymer as a whole amounts to between 90 and 10% by weight and preferably to between 80 and 40% by weight. The graft polymers according to the invention have mean particle diameters ($d_{50}$) of from 0.05 to 20$\mu$ and preferably from 0.1 to 3$\mu$. Particularly preferred particle diameters are from 0.1 to 1$\mu$.

The constituent material of the core (a) is a crosslinked rubber of one or more conjugated dienes, such as polybutadiene, or a copolymer of a conjugated such as polybutadiene, or a copolymer of a conjugated diene with up to 10% by weight of styrene or acrylonitrile or methylmethacrylate. The gel content of the rubber is more than 50%, preferably more than 80%.

Its Mooney viscosity is ML4' more than 30, preferably 50–150.

The first shell (b) is formed by a crosslinked acrylate rubber and is in particular a crosslinked homopolymer of acrylic acid alkyl esters. Optionally, copolymers with up to 30% by weight, preferably up to 20% by weight of other vinyl monomers can be used. Suitable polymerizable acrylic acid esters include $C_1$–$C_8$-alkyl esters, for example methyl, ethyl, butyl, octyl and 2-ethyl hexyl ester, haloalkyl esters, acrylate, and aromatic esters, such as benzyl acrylate and phenethyl acrylate. They may be used either individually or in admixture, at least one alkyl ester having to be present in the mixture. For crosslinking, polyfunctional monomers are copolymerized; suitable examples being esters of unsaturated carboxylic acids with a polyol (preferably 2 to 20 carbon atoms in the ester group), such as ethylene glycol dimethylacrylate, esters of a polybasic carboxylic acid with an unsaturated alcohol (preferably 8 to 30 carbon atoms in the ester residue), such as triallyl cyanurate, triallyl isocyanurate; divinyl compounds, such as divinyl benzene; esters of unsaturated carboxylic acids with unsaturated alcohols (preferably 6 to 12 carbon atoms in the ester residue), such as allyl methacrylate; phosphoric acid esters, for example triallyl phosphate and 1,3,5-triacryloyl, hexahydro-s-triazine. Particularly preferred polyfunctional monomers are triallyl cyanurate, triallyl isocyanurate, triallyl phosphate, allyl methacrylate, ethylene glycol dimethylacrylate and 1,35-triacryloyl hexahydro-s-triazine.

The polyfunctional monomers used for crosslinking are preferably employed in a quantity of from 0.05 to 10% by weight and more particularly in a quantity of from 0.1 to 5.0% by weight, based on the weight of the first shell (b). The elastomer of the first shell (b) may additionally contain one or more copolymerizable monomers of the vinyl or vinylidene type in copolymerised form. Examples are methyl methacrylate, butyl methacrylate, acrylonitrile, styrene, $\alpha$-methyl styrene, acrylamides, vinyl alkyl ethers. These comonomers may be copolymerised in quantities of up to 30% by weight, based on polymer (b). When polymerized independently of rubber (a), the rubbbers (b) are crosslinked, have Mooney viscosities of ML4' more than 30, preferably 50–150 and second order transition temperatures of less than $-40°$ C.

The second shell (c) is formed by a graft-polymerised polymer of monomers, such as $\alpha$-methyl styrene, styrene/acrylonitrile methyl methacrylate or a copolymer of these monomers, preferably by copolymers of styrene and acrylonitrile in a ratio by weight of from 90:10 to 50:50. The graft polymers according to the invention may be produced in aqueous emulsion as described in the following:

The diene rubber for the core (a) is initially produced in latex form by the emulsion polymerisation of a conjugated diene. This polymerisation process is known. The acrylate rubber for the first shell is then prepared in the presence of the diene rubber latex, again in aqueous emulsion, by emulsifying the monomers (main constituent at least one acrylate) in the latex and polymerising the resulting emulsion in known manner in the presence of radical-forming initiators. The acrylate rubber polymerises onto the diene rubber. It may even be crosslinked during its production by using polyfunctional monomers.

In this graft polymerisation of the first shell (b), the formation of new particles must be suppressed as far as possible. An emulsion stabiliser must be present in a quantity sufficient to cover the surface of the particles. The size of the particles may be varied within wide limits, depending on how the reaction is carried out. If an agglomerated latex is used as the core (a) to obtain large particles, these large particles may contain several diene rubber particles. Polymerisation of the first shell (b) may also be carried out so that particles having a diene rubber core and, at the same time, particles of pure crosslinked acrylate rubber are produced. Mixtures of this type may also be used under special conditions for the production of high-impact moulding compositions. On completion of the graft polymerisation of the acrylate rubber, a vinyl monomer or a mixture of vinyl monomers is polymerised in emulsion onto the resulting latex. The graft polymers according to the invention are formed along with the second shell (c) during this graft polymerisation reaction. In this graft polymerisation process, which is known per se, and which is normally carried out in the presence of radical initiators, for example water-soluble initiators, emulsifiers or complex formers/graft activators and regulators, free polymers or copolymers of the monomers forming the second shell (c) are generally formed to a certain extent in addition to the graft polymer. The quantity in which this ungrafted polymer is formed may be characterized by the degree of grafting or the grafting yield and is governed inter alia by the polymerisation conditions, the composition of the first shell (b), the size of the particles to be grafted and the quantity of acrylate rubber grafted on. In the context of the invention, therefore, the term "graft polymer" applies to the product obtained by the polymerisation of vinyl monomers in the presence of the rubber latex, i.e. strictly speaking to a mixture of graft polymer and free copolymer of the graft monomers.

The graft polymers thus produced may be worked up by known standards, for example by coagulation of the latices with electrolytes (salts, acids or mixtures thereof), followed by purification and drying.

The graft polymers according to the invention represent high-notched-impact moulding compositions having improved weather and ageing resistance. They can be processed by thermoplastic molding but retain partly elastomeric properties. The graft polymer according to the invention may be directly used provided that about 5 to 40% by weight thereof consist of core (a) and first shell (b), based on the graft polymer as a whole. If the content of (a) plus (b) is higher, rigid resin may be added. Rigid resins are preferably styrene, methyl methacrylate, acrylonitrile terpolymers, styrene or α-methyl styrene, acrylonitrile copolymers, styrene, acrylonitrile, acrylate terpolymers or methyl methacrylate homopolymers or copolymers.

The graft polymers according to the invention can also be mixed with known rubber-modified plastics, for example with ABS-plastics or with acrylate-rubber-modified resins ("ASA-resins"). They constitute modifiers, which improve physical properties. It is possible in this way to improve the ageing resistance and electrostatic properties of ABS without adversely affecting its mechanical properties or the mechanical properties of ASA-resins and the surface quality of moldings produced therefrom.

The moulding compositions according to the invention may contain dyes and pigments, heat-and-light-stabilisers, plasticisers, foaming agents and organic or inorganic fillers in granular, powder or fibre form. They may be formed, for example, by injection moulding or by extrusion and are suitable for shaped articles of any type which are required to be weather-resistant and impact-resistant. For example, they may be used for the outer layer of a laminate of several different polymers.

The parts and percentages quoted in the following Examples represent parts by weight and percentages by weight.

EXAMPLES

EXAMPLE 1

Production of the graft polymers:

1.1 Production of the polydiene latices (core [a]):

1.1.1 The following emulsion is polymerised with stirring in a reactor at 65° C. until the monomer conversion is substantially complete (which is the case after about 22 hours):

90.0 Parts by weight of butadiene;
10.0 parts by weight of styrene;
1.8 parts by weight of the sodium salt of disproportionated abietic acid;
0.257 parts by weight of sodium hydroxide;
0.3 part by weight of n-dodecyl mercaptan;
1.029 parts by weight of sodium ethylene diamine tetraacetate;
0.023 part by weight of potassium persulphate; and
176 parts by weight of water.

A latex is obtained which contains butadiene/styrene copolymer particles having a mean diameter ($d_{50}$) of $0.1\mu$ in a concentration of approximately 35 to 36%.

1.1.2 The following eumulsion is polymerised over a period of about 110 hours at 60° to 68° C. in the same way as described in 1.1.1:

100.0 parts by weight of butadiene;
70 parts by weight of water;
1.146 parts by weight of the sodium salt of disproportionated abietic acid;
0.055 part by weight of sodium ethylene diamine tetraacetate;
0.137 part by weight of sodium hydroxide;
0.028 part by weight of sodium hydrogen carbonate; and
0.282 part by weight of potassium persulphate A latex is obtained which contains polybutadiene particles having a mean diameter ($d_{50}$) of $0.4\mu$ in a concentration of the order of 58%.

1.2 Production of acrylate rubber particles containing polydiene cores (core[a] with first shell [b]):

1.2.1 The following mixture is introduced into a reactor with stirring at 65° C.:

150 parts by weight of the latex according to 1.1.1;
1350 parts by weight of water; and
4.1 parts by weight of potassium persulphate in
260 parts by weight of water.

The following mixtures are separately introduced into the reactor over a period of 4 to 5 hours at 65° C.:

Mixture A (see Table 1)
Mixture B
1010 parts by weight of water;
35 parts by weight of the sodium salt of disproportionated abietic acid; and
35 parts by weight of 1 N sodium hydroxide.

Polymerisation is then completed over a period of 4 hours at 65° C.

TABLE 1

| Example | Mixtures A Monomers (parts by weight) |
|---|---|
| 1.2.1.1 | 1420 n-butylacrylate/10 triallylcyanurate |
| 1.2.1.2 | 1220 n-butylacrylate/200 c-hexylacrylate/ 10 triallylcyanurate; |
| 1.2.1.3 | 1278 n-butylacrylate/142 methyl methacrylate/ 20 triallylcyanurate; and |
| 1.2.1.4 | 1400 n-butylacrylate/8 triallyl phosphate/ 1 ethylene glycol dimethacrylate |

The polymers formed have gel contents of more than 85% by weight, degrees of swelling of from 5 to 15 and mean particle diameters ($d_{50}$) of from 0.2 to 0.3μ.

1.2.2 The following components are introduced into a reactor and heated to 65° C.:
50 parts by weight of latex 1.1.2; and
285 parts by weight of water.

Polymerisation is initiated with a mixture of
0.81 part by weight of potassium persulphate; and
51.0 parts by weight of water.

The following mixtures are separately introduced into the reactor over a period of 5 hours at 65° C.:
Mixture A (see Table 2)
Mixture B
240 parts by weight of water; and
4.8 parts by weight of the sodium sulphonate of $C_{14}$–$C_{18}$-hydrocarbons.

Polymerisation is then completed over a period of 4 hours at 65° C.

TABLE 2

| Example | Mixture A used Monomers (parts by weight) |
|---------|-------------------------------------------|
| 1.2.2.1 | 276 n-butylacrylate/0.5 triallylcyanurate |
| 1.2.2.2 | 279 9-ethylhexylacrylate/0.6 triallyl cyanurate. |

The polymers formed have gel contents of more than 85% by weight, degrees of swelling of from 5 to 15 and a wide particle diameter distribution in the range from 0.15 to 0.9μ ($d_{10}$–$d_{90}$).

1.3 Production of the graft polymers:
General Procedure:
The following components are introduced into a reactor and heated to 65° C.:
283 parts by weight of water; and
X parts by weight of latex.

Polymerisation is initiated with a mixture of
6 parts by weight of potassium persulphate; and
415 parts by weight of water.

The following mixtures are run into the reactor with stirring over a period of 5 hours at 65° C.:

| Mixture A | Y parts by weight of monomer(1) see Table 3 |
|-----------|---------------------------------------------|
| Mixture B | Z parts by weight of monomer(2) |
|           | 800 parts by weight of water |
|           | 21 parts by weight of the sodium sulphonate of $C_{14}$–$C_{18}$-hydrocarbons. |

Polymerisation is then completed over a period of 4 hours at 65° C.

Following the addition of an aqueous stabiliser dispersion, corresponding to 0.25–1.5 parts by weight of a phenolic oxidation inhibitor per 100 parts by weight of latex solids, the graft polymer latices are coagulated by the addition of electrolyte or acid. The resulting powders are dried in vacuo at 70° C.

The graft polymers isolated from the emulsion are processed with thermoplastic resin polymers and, optionally, conventional graft polymers and, optionally, with additions according to 2.1 to form moulding compositions.

TABLE 3

Compositions of the polymerisation mixtures corresponding to the general procedure in 1.3

| Example | X parts by weight of latex | Mixture A Y parts by weight of monomer 1 | Z parts by weight of monomer 2 |
|---------|----------------------------|------------------------------------------|--------------------------------|
| 1.3.1.  | 1857 latex 1.2.1.1.        | 178 acrylonitrile                        | 460 styrene                    |
| 1.3.2.  | 1857 latex 1.2.1.2.        | 178 acrylonitrile                        | 460 styrene                    |
| 1.3.3.  | 1857 latex 1.2.1.3.        | 178 acrylonitrile                        | 460 styrene                    |
| 1.3.4.  | 1857 latex 1.2.1.4.        | 178 acrylonitrile                        | 460 styrene                    |
| 1.3.5.  | 1857 latex 1.2.2.1.        | 178 acrylonitrile                        | 460 styrene                    |
| 1.3.6.  | 1850 latex 1.2.2.2.        | 178 acrylonitrile                        | 460 styrene                    |
| 1.3.7.  | 2600 latex 1.2.2.1.        | 107 acrylonitrile                        | 276 styrene                    |
| 1.3.8.  | 2500 latex 1.2.2.1.        | 300 methyl methacrylate                  | 83 styrene                     |

2. Properties of some thermoplastic moulding compositions containing the graft polymers according to the invention as mixture component:

The moulding compositions specified in Table 4 are produced by compounding under the following mixing conditions in a BR (Pomini-Farrel) Banbury mixer;

| Melt temperature: | 190–225° C. |
|-------------------|-------------|
| Mixing times:     | 1.5–2 minutes |
| Cycle times:      | 2–4 minutes |

The mixture is discharged from the Banbury mixer onto a two-roll stand (roll 1 T=160° C., roll 2 T=150° C.) from which it is removed in the form of a band and granulated after cooling.

TABLE 4

Thermoplastic mixtures

| Example | Graft polymer parts | Graft polymer parts | Resin parts | Lubricants parts | Pigments parts |
|---------|---------------------|---------------------|-------------|------------------|----------------|
| 2.3.1   | 40 1.3.1            | —                   | 60 SAN      | 3 AC             | —              |
| 2.3.1   | 40 1.3.2            | —                   | 60 SAN      | 3 AC             | —              |
| 2.3.3   | 40 1.3.3            | —                   | 60 SAN      | 3 AC             | —              |
| 2.3.4   | 40 1.3.4            | —                   | 60 SAN      | 3 AC             | —              |
| 2.3.5   | 40 1.3.5            | —                   | 60 SAN      | 3 AC             | —              |
| 2.3.6   | 40 1.3.6            | —                   | 60 SAN      | 3 AC             | —              |
| 2.3.7   | 25 1.3.7            | —                   | 75 SAN      | 3 AC             | —              |
| 2.3.8   | 20 1.3.8            | 20 Pl               | 60 SAN      | 3 AC             | —              |
| 2.3.9   | 30 1.3.2            | 10 Pl               | 60 SAN      | 3 AC             | 2 $TiO_2$      |
| 2.3.10  | 20 1.3.2            | 20 Pl               | 60 SAN      | 3 AC             | 2 $TiO_2$      |
| 2.3.11  | 10 1.3.2            | 30 Pl               | 60 SAN      | 3 AC             | 2 $TiO_2$      |
| 2.3.12  | 40 1.3.2            | —                   | 60 SAN      | 3 AC             | 2 $TiO_2$      |
| 2.3.13  | —                   | 40 Pl               | 60 SAN      | 3 AC             | — (comparison Example) |

AC = bis-stearyl amide of ethylene diamine
Pl = graft polymer of 50 parts of styrene and acrylonitrile (ratio 72:28) on 50 parts of polybutadiene latex. Mean particle diameter ($d_{50}$) 0.4μ.
SAN = copolymer of 72% of styrene and 28% of acrylonitrile. Staudinger-Index [η] = 0.85 dl/g (DMF, 25° C.).

2.2 Test Procedure

Standard small test bars are injection-moulded from the granulate at 220° C. and are tested by DIN methods for notched impact strength, hardness and thermal stability under load (Vicat B).

TABLE 5

Properties of the moulding compositions of Table 4[1]

| Mixture | Impact strength 23° C. (kJ/$m^2$) | Notched impact Strength 23° C. (kJ/$m^2$) | Ball indentation hardness (39 s) | Dimensional stability under heat (°C.) Vicat B | Surface quality of the injection mouldings[2] |
|---------|-----------------------------------|-------------------------------------------|----------------------------------|------------------------------------------------|-----------------------------------------------|
| 2.3.1.  | unbroken                          | 10.5                                      | 90                               | 93                                             | shiny surface, no |

TABLE 5-continued
Properties of the moulding compositions of Table 4[1]

| Mixture | Impact strength 23° C. (kJ/m²) | Notched impact Strength 23° C. (kJ/m²) | Ball indentation hardness (39 s) | Dimensional stability under heat (°C.) Vicat B | Surface quality of the injection mouldings[2] |
|---|---|---|---|---|---|
| 2.3.2. | unbroken | 11.0 | 91 | 90 | mother-of-pearl-like appearance shiny surface, no mother-of-pearl-like appearance |
| 2.3.3. | unbroken | 10.9 | 94 | 94 | shiny surface, no mother-of-pearl-like appearance |
| 2.3.4. | unbroken | 11.8 | 90 | 90 | shiny surface, no mother-of-pearl-like appearance |
| 2.3.5. | unbroken | 13.9 | 84 | 90 | shiny surface, no mother-of-pearl-like appearance |
| 2.3.6. | unbroken | 14.0 | 87 | 91 | shiny surface, no mother-of-pearl-like appearance |
| 2.3.7. | unbroken | 13.8 | 86 | 89 | shiny surface, no mother-of-pearl-like appearance |
| 2.3.8. | unbroken | 15.1 | 80 | 90 | shiny surface, no mother-of-pearl-like appearance |
| 2.3.9. | unbroken | 12.5 | 81 | 92 | shiny surface, no mother-of-pearl-like appearance |
| 2.3.10. | unbroken | 14.0 | 81 | 92 | shiny surface, no mother-of-pearl-like appearance |
| 2.3.11. | unbroken | 16.0 | 80 | 93 | shiny surface, no mother-of-pearl-like appearance |
| 2.3.12. | unbroken | 11.0 | 80 | 93 | shiny surface, no mother-of-pearl-like appearance |
| 2.3.13. | unbroken | 17.5 | 78 | 92 | shiny surface, no mother-of-pearl-like appearance |

[1] In contrast to the injection moulding of mixture 2.3.13., which show serious yellowing after 20 days' testing in a Weatherometer, mouldings of mixtures 2.3.1.–2.3.7. show hardly any yellowing whilst mouldings of mixtures 2.3.8.–2.3.11. show less yellowing than mouldings of mixture 2.?.13.
[2] Visual assessment Table 5 shows that, in addition to an outstanding surface quality, high-notched-impact moulding compositions based on the graft polymers according to the invention show considerably improved weather resistance (discolouration), even by comparison with conventional ABS-material.

Particle sizes are determined by light-scattering measurements[1]. Gel content/degree of swelling (measured at 25° C. in DMF)[1].

[1] cf. M. Hoffman, K. Kramer and R. Kuhn; Polymer analytik I & II, Georg Thieme Verlag, Stuttgart (1977).

We claim:
1. Particulate graft polymer comprising
 (a) a core which is a crosslinked homopolymer of a conjugated diene or a copolymer thereof with up to 10% by weight of copolymerized styrene or acrylonitrile and having a gel content of more than 50%,
 (b) a first shell which is a crosslinked rubber formed by polymerizing a monomer mixture consisting of at least one acrylic acid alkyl ester having 1 to 8 carbon atoms in the alkyl moiety and 0.05 to 10% by weight, based on the weight of (b), of a crosslinking polyfunctional monomer and
 (c) a second shell of a polymer of at least one resin-forming monomer selected from the group consisting of α-methyl styrene, styrene, acrylonitrile and methyl methacrylate.
2. Particulate graft polymer according to claim 1, wherein the weight ratio of (a) and (b) is 0.1 to 99.9 to 80 to 20.
3. Particulate graft polymer according to claim 1, wherein the core (a) is polybutadiene.
4. Particulate graft polymer according to claim 1, wherein (c) is a copolymer of styrene and acrylonitrile.
5. A moulding composition comprising a particulate graft polymer according to claim 1 and a rigid thermoplastic resin.
6. A moulding composition as claimed in claim 5, wherein the rigid thermoplastic resin is a styrene/acrylonitrile copolymer.

* * * * *